United States Patent [19]

Mukerjee et al.

[11] Patent Number: 4,545,134
[45] Date of Patent: Oct. 8, 1985

[54] DUAL VESSEL HEAT EXCHANGE SYSTEMS

[75] Inventors: Ajit K. Mukerjee, Whitehall, Pa.; Patrick J. Kearns, Washington; Davis J. Rieman, Paramus, both of N.J.

[73] Assignee: The BOC Group, Inc., Montvale, N.J.

[21] Appl. No.: 712,480

[22] Filed: Mar. 18, 1985

Related U.S. Application Data

[63] Continuation of Ser. No. 481,177, Apr. 1, 1983, abandoned.

[51] Int. Cl.⁴ .................................................. F26B 3/04
[52] U.S. Cl. ............................................. 34/27; 34/32; 34/77; 34/242
[58] Field of Search ............................ 34/77, 86, 242, 27, 34/32, 34, 51, 76; 62/11, 54; 165/1; 427/372.2, 398.4, 335; 118/61

[56] References Cited

U.S. PATENT DOCUMENTS 4,150,494 4/1979 Rothchild ............................ 34/28
4,444,016 4/1984 Banerjee ............................. 62/54

Primary Examiner—Larry I. Schwartz
Attorney, Agent, or Firm—David L. Rae; Larry R. Cassett

[57] ABSTRACT

A vapor component of a gas mixture is separated by condensation and is recovered for further use. A solvent vapor mixed with inert gas is condensed in a multistage heat exchange system in a manner which utilizes a first refrigerant to condense a portion of the vapor in a first heat exchange device, a second refrigerant, typically cold inert gas, for condensing a further portion of the vapor in a second heat exchanger and a third heat exchange device wherein chilled liquid is utilized to condense a still further portion of the vapor. In a fourth heat exchange device, a cryogenic liquid is passed in heat exchange relation with the liquid passed thereto from the third heat exchange device. The cryogenic liquid is vaporized to form an essentially pure inert gas which is supplied to the vicinity of the oven exit and entrance, but exteriorly of the oven to form inert gas barriers. The fourth heat exchange device may effect direct or indirect heat exchange with the cryogenic liquid. By maintaining the vaporized inert gas separate from the inert gas separated from the condensed solvent vapor, a mass balance between gas flows in and out of the oven is readily maintained.

13 Claims, 2 Drawing Figures

DUAL VESSEL HEAT EXCHANGE SYSTEMS

This application is a continuation of Ser. No. 481,177, filed Apr. 1, 1983, now abandoned.

BACKGROUND OF THE INVENTION

The present invention relates to methods and apparatus for condensing a vapor component of a gas mixture and more particularly to the efficient condensation and recovery of solvent vapor from a gas mixture containing such vapor and inert gas.

During the curing of solvent borne resin coatings in a curing oven, the solvent is evaporated into the oven atmosphere. Traditionally, extremely high air flows were forced through such ovens to limit the solvent vapor partial pressure to values below the lower explosive limit of such vapors in air and to remove such vapors from the oven. These prior art curing processes are objectionable in that large air flows remove excessive amounts of heat from the ovens and consequently high levels of fuel consumption are required to continually supply such heat. In addition, the discharge of hydrocarbon based solvents such as acetone, toluene, etc. to the atmosphere degrade air quality. Although it is possible to incinerate solvents in such discharged air streams, additional fuel is frequently required in order to sustain combustion and such solvents cannot be recovered for future use.

Various techniques have been proposed to recover solvent vapors from curing ovens or drying chambers such as the methods and apparatus illustrated in U.S. Pat. No. 4,150,494 which is assigned to the assignee of the present invention. In this patent, liquid nitrogen is utilized as a refrigerant for condensing solvent vapor withdrawn from a curing oven or the like with the resulting, vaporized nitrogen being returned to the oven to inert the same. This enables the recovery of condensed, liquid solvent and avoids the discharge of solvent vapor to atmosphere. The total gas flows through the curing oven are diminished and thus, the quantity of fuel necessary to maintain desired oven temperatures is also reduced. This reference also discloses a single pass heat exchange device for condensing solvent vapors against a countercurrent flow of liquid nitrogen and means for sensing the temperature of the condensed solvent so that the flow of liquid nitrogen to the heat exchange means can be controlled to avoid freezing of the solvent. However, the solvent vapor-inert gas mixture withdrawn from the oven atmosphere generally contains a minor component of moisture, and it is frequently necessary to subject the solvent vapor to relatively low temperatures, below 32° F. to condense acceptable fractions thereof. Moisture will freeze and tend to clog piping or other conduits utilized to recover condensed solvent when such low temperatures are employed. Although the degree of refrigeration supplied to condense solvent vapor may be reduced upon using lower flows of liquid nitrogen, a corresponding reduction in the solvent fraction actually condensed will result and consequently, the non-condensed gas leaving the heat exchange means will contain an unacceptably high partial pressure of solvent vapor. Typically, it is desired to remove by condensation at least 99% or more of the solvent vapor in the withdrawn oven atmosphere. In addition, vaporized nitrogen is returned to the oven through vestibules which tends to increase the difficulty of achieving a mass balance of flows of gas in and out of the oven.

In order to facilitate the condensation of solvent vapor withdrawn from curing ovens in an inert gas mixture, it has been proposed to vaporize a cryogenic liquid to form a cold inert gas (i.e. nitrogen) and utilize the refrigeration in such gas to chill by indirect heat exchange the liquid phase of a solvent. The chilled solvent may then be utilized to condense solvent vapor supplied to a suitable heat exchange device as is illustrated in U.S. Pat. No. 4,237,700 which is also assigned to the assignee of the present invention. However, this system requires relatively large flows of cold, inert gas through an endless conduit and, consequently, is not a particularly effective means for condensing solvent vapor as these systems are bulky and require considerable floor space in a curing plant or facility. A further proposal for utilizing the refrigeration of a cryogenic liquid to condense solvent vapors is described in French published patent application No. 2,349,113. This reference teaches an indirect heat exchange process wherein liquid nitrogen is utilized to condense vapors emitted from a drying chamber. The use of water cooled heat exchange means alone for the purpose of condensing a solvent vapor from a gas mixture is illustrated in U.S. Pat. No. 2,746,168. However, this system is limited in that intense refrigeration is not available from cooling water and frequently intense refrigeration is required in order to condense a high fraction of solvent vapor, typically 99% or more than a gas mixture.

Although the prior art techniques described above provide various approaches to the problem of condensing a vapor component from a gaseous mixture, none of these approaches is fully satisfactory for condensing virtually all of a solvent vapor from an inert gas mixture which may also contain minor components of moisture. Thus, the above noted prior art does not describe efficient processes or apparatus for condensing virtually all of the solvent vapor in inert gas withdrawn from an oven or drying chamber, etc. at a temperature of approximately 250°–600° F. in a safe, reliable and cost efficient method.

One approach toward the recovery of solvent vapor by condensation is described in U.S. Pat. No. 4,444,016, which is assigned to the assignee of the present invention. This approach involves the introduction of a gaseous mixture of solvent vapor and inert gas into a heat exchange vessel which contains a body of the condensed solvent vapor. A stream of cryogenic liquid is introduced directly into this body of condensed solvent vapor to thereby chill the same and enable it to be utilized as reflux liquid. Heat exchange between the reflux liquid solvent and the solvent vapor effects condensation of the latter. The inert gas supplied to the vessel with the solvent vapor is combined with the vaporized cryogenic liquid as an overhead gas and, after being used as a refrigerant in an earlier heat exchange device, is returned to a curing oven to inert the same. However, as the inert gas flow returned to the oven is greater than the flow rate at which inert gas is withdrawn from the oven, it is necessary to control the return flow to maintain a mass balance with respect to the oven. One such control system is illustrated in U.S. Pat. No. 4,475,293 which is also assigned to the assignee of the present invention. Although this control system is effective, equipment in the form of flow transmitters, a ratio controller, etc. is required which in turn increases the overall cost of apparatus for recovering solvent vapor from a particular oven.

Accordingly, there is a clear need for methods and apparatus for recovering solvent vapor from inerted curing ovens or the like by heat exchange with a cryogenic liquid wherein a mass balance between gas flows entering and exiting the curing oven may be readily maintained without requiring costly and complex control equipment.

OBJECTS OF THE INVENTION

It is an object of the invention to provide improved methods and apparatus for continuously condensing and separating a vapor component of a gas mixture therefrom.

It is another object of the invention to provide improved methods and apparatus for continuously, efficiently and reliably condensing virtually all solvent vapor from a gas mixture comprising inert gas and solvent vapor.

It is a further object of the invention to provide improved methods and apparatus for condensing solvent vapor withdrawn from inerted ovens wherein a mass balance is readily maintained with respect to gas flows into and from the oven.

It is still another object of the invention to provide improved methods and apparatus for enabling the continuous condensation of any of a plurality of different solvent vapors from gas mixtures of such vapors and inert gas without releasing any significant quantities of solvent vapor to ambient atmosphere.

It is yet another object of the invention to condense solvent vapor from a gas mixture and recovering condensed solvent at a temperature suitable for storage.

It is another object of the invention to provide improved methods and apparatus for condensing solvent vapor from an inerted curing oven by heat exchange with the liquid phase of the inert gas without supplying the vaporized liquefied gas into the oven.

Other objects of the invention will become apparent from the following description of exemplary embodiments thereof which follows and the novel features will be particularly pointed out in conjunction with the claims appended thereto.

SUMMARY

In accordance with the invention, solvent vapor is recovered from a mixture of solvent vapor and inert gas with minor concentrations of oxygen, i.e. the "process gas stream" which is withdrawn from a curing oven or the like. The solvent vapor is condensed by means of the refrigeration available in a cryogenic liquid, such as liquid nitrogen, thereby vaporizing this liquid to form a commercially pure inert gas. The vaporized cryogenic liquid is supplied to the vicinity of and exteriorly of the entrance and exit of the curing oven to form an inert gas barrier and thereby preclude the entry of ambient air into the oven and the loss of the oven atmosphere from the oven.

The uncondensed gas separated from the withdrawn oven atmosphere is essentially comprised of an inert gas such as nitrogen with trace amounts of solvent vapor and oxygen. This separated gas is hereinafter referred to as "process nitrogen" and is returned to the curing oven to maintain an inert atmosphere therein. The mass flow rate at which process nitrogen is returned to the oven is substantially equal to the mass flow rate at which nitrogen is removed from the oven by withdrawal of the oven atmosphere which is the process gas stream for supply to the solvent recovery system according to the invention and consequently, a mass balance with respect to nitrogen flows in and out of the oven is readily maintained. Solvent vapor is formed by evaporating solvent borne coatings being cured on surfaces passed through the oven and the rate at which solvent vapor is withdrawn from the oven is substantially equal to the rate at which solvent vapor is formed by evaporation therein and thus, a mass balance is maintained with respect to solvent vapor being formed in and being withdrawn from the oven. This mass balance of solvent vapor and nitrogen flows may be maintained by the use of the present invention without requiring extensive, complex and costly control systems which are required in solvent recovery apparatus wherein process nitrogen is mixed with nitrogen being vaporized from liquid nitrogen supplied as a refrigerant.

Separation of solvent vapor from withdrawn oven atmosphere may be achieved with apparatus according to the invention by utilization of several stages of heat exchange. For example, cold water may be used as a refrigerant in a first heat exchange stage to condense a portion of the solvent vapor from the withdrawn atmosphere which portion is collected in suitable storage means. In a second, subsequent heat exchange stage, cold inert gas such as the process gas returned from a subsequent heat exchange stage may be utilized to chill and condense a further portion of the solvent vapor supplied to such second stage. In a subsequent stage or stages, the refrigeration available from a cryogenic liquid may be utilized to chill virtually all of the remaining solvent vapor in the withdrawn oven atmosphere which exits the second heat exchange stage. In such latter heat exchange stages, a liquid cryogen is preferably passed in indirect heat exchange relation with an intermediate heat exchange medium, e.g. toluene, which is in turn chilled and passed in indirect heat exchange relation with the withdrawn oven atmosphere exiting the second or previous heat exchange stage. Upon condensation of still further solvent vapor by heat exchange with the intermediate medium, condensed solvent may be collected and recovered while the now warmed intermediate medium is supplied in indirect heat exchange relation with the liquid cryogen in the last heat exchange stage of apparatus according to the invention. This chilling of the intermediate heat exchange medium is effective to vaporize the liquid cryogen which is utilized as inert gas curtains exteriorly of the oven entrance and exit as mentioned above. While the non-condensed portion of the withdrawn oven atmosphere which exits the indirect heat exchange stage to which the chilled intermediate heat exchange medium is supplied is returned to the oven as process nitrogen. Accordingly, two streams leaving the two coldest stages of heat exchange of apparatus according to the invention are utilized for different purposes in that the process nitrogen is utilized to chill and condense solvent vapor in an earlier or second heat exchange stage and is then supplied directly to the oven while the vaporized cryogenic liquid is utilized exteriorly of the oven as an inert gas barrier. By recycling or returning the process nitrogen to the oven, trace solvent vapor therein is retained within the oven-solvent recovery apparatus and is not lost to ambient atmosphere. In addition, a mass balance may be easily established and maintained between the flow of process nitrogen to the oven and nitrogen in the stream of oven atmosphere removed therefrom. The other nitrogen stream leaving the solvent recovery apparatus according to the invention is, as mentioned above, free of solvent vapor and may be effectively utilized as inert gas barriers, but such use does not impede or disturb the aforementioned mass balance of nitrogen with respect to the curing oven.

Appropriate controls may be utilized in accordance with the invention, for example, to sense and control the temperature of the intermediate heat exchange medium, or the like. Additionally, liquid level controls may be utilized to sense the level of condensed solvent in the lower portions of heat exchange stages of apparatus according to the invention so that the rate of removal of such condensed solvent by a pump or other suitable means may be readily controlled.

In accordance with an alternative embodiment of the present invention, first and second heat exchange stages utilizing cold water and cold inert gas as described above may also be utilized in conjunction with subsequent heat exchange stages in which uncondensed solvent vapor from the withdrawn oven atmosphere is supplied to a reflux heat exchanger wherein chilled liquid solvent is utilized to condense such remaining solvent vapor, and in a further chilling device, liquid solvent removed from the reflux heat exchanger is chilled by direct heat exchange with a liquid cryogen. The chilled condensed solvent is withdrawn from the chilling device and is supplied as a reflux liquid to the reflux heat exchange device thereby condensing solvent vapor as mentioned above while the liquid cryogen supplied to the liquid chilling device is vaporized and removed as a substantially pure inert gas from the overhead portion of such chilling device. The non-condensed gas exiting the overhead portion of the reflux heat exchange device is essentially process nitrogen as described above and is utilized in a preceding heat exchange stage to condense solvent vapor before being returned to the curing oven. The vaporized liquid cryogen exiting the chilling device is essentially free of solvent vapor and may be utilized as an inert gas curtain immediately exteriorly of the entrance and exit of a curing oven. By so producing separate flows of process nitrogen and vaporized liquid cryogen as described above, a mass balance may be readily established and maintained with respect to nitrogen flows in and out of the oven while inert gas curtains may be formed without releasing any significant quantity of solvent vapor to the ambient atmosphere exteriorly of the curing oven. Although the method and apparatus according to the invention utilize two vessels to achieve heat exchange between the cryogenic liquid and the solvent vapor in the withdrawn oven atmosphere, two separate nitrogen flows are obtained thereby in addition, of course, to condensing solvent vapor, and each of such nitrogen flows can be utilized in a manner most beneficial toward the effective recovery of solvent, operation of an inerted curing oven and the interfacing of such an oven with a solvent recovery unit.

BRIEF DESCRIPTION OF THE DRAWING

The invention will be more clearly understood by reference to the following description of exemplary embodiments thereof in conjunction with the following drawing in which.

DESCRIPTION OF PREFERRED EMBODIMENTS

Figure 1:
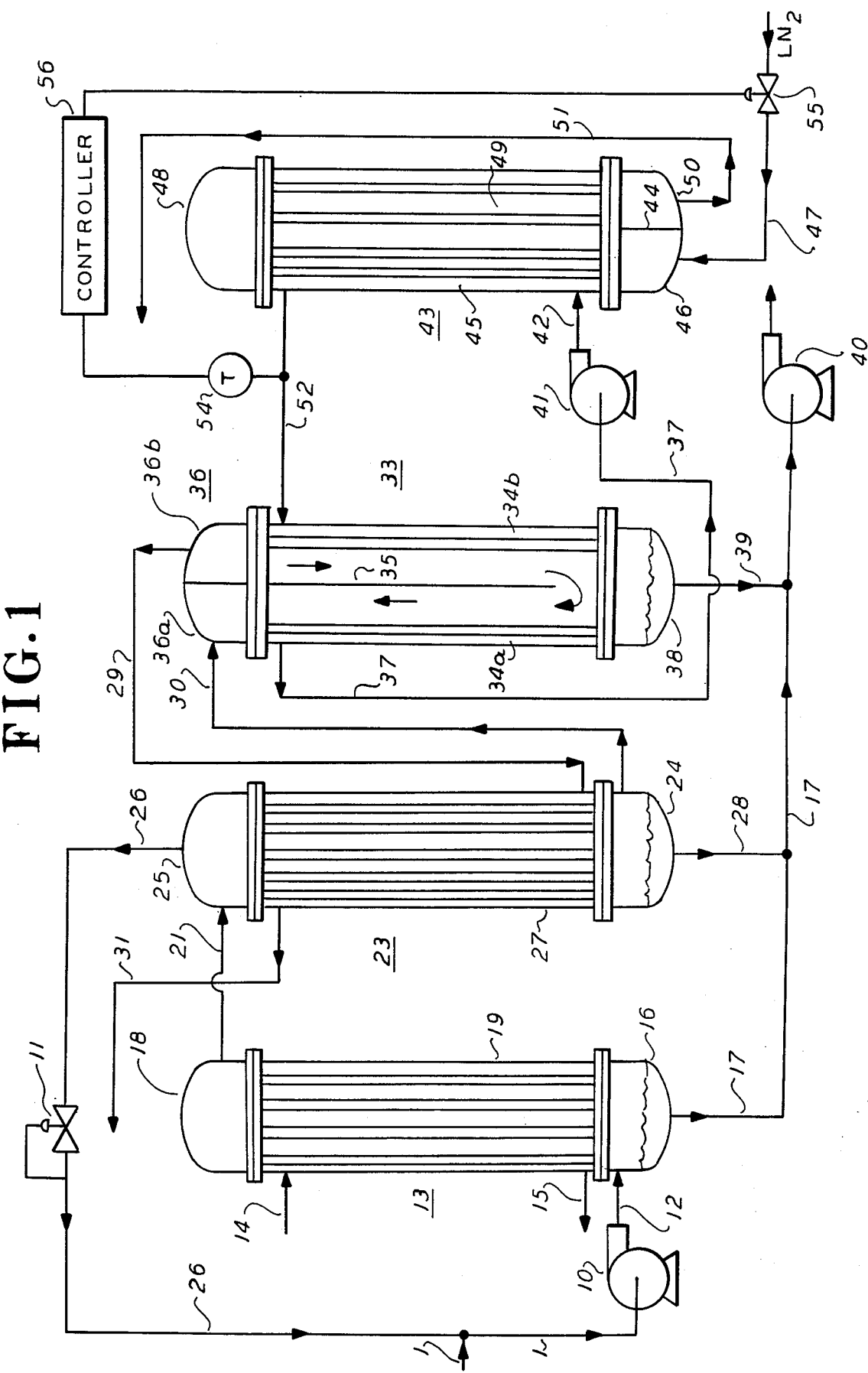
FIG. 1 is a diagramatic view of apparatus utilizing indirect heat exchange to condense solvent vapor in accordance with the invention.

Referring now to FIG. 1, illustrated therein is an exemplary embodiment of apparatus according to the invention wherein a stream of atmosphere removed from a curing oven is supplied through conduit 1 to the suction side of blower 10. This stream is essentially comprised of nitrogen, solvent vapor, and minor quantities of oxygen. A recycle conduit 26 communicates with conduit 1, and conduit 26 is effective to supply a recycle stream essentially comprised of nitrogen and solvent vapor from the overhead portion of heat exchanger 23 through control valve 11. The outlet of blower 10 is coupled to a lower or sump portion 16 of indirect heat exchange device 13 which is preferably comprised of a shell and tube heat exchange unit. A refrigerant such as cold water is preferably supplied to the shell side of heat exchanger 13 through conduit 14 and is withdrawn through outlet conduit 15. The solvent vapor supplied to lower portion 16 is cooled by such refrigerant as this gas stream flows upwardly through the tube section 19 of heat exchanger 13, and a portion of the solvent vapor in this stream condenses within such tubes and flows downwardly into lower portion 16 to enable removal of condensed solvent through drain conduit 17. The remaining uncondensed solvent and nitrogen which flows upwardly into overhead portion 18 of heat exchanger 13 is removed through conduit 21 and is supplied to the overhead portion 25 of heat exchanger 23 which is also a shell and tube heat exchange unit. A flow of cold inert gas such as nitrogen is supplied to the shell side of heat exchanger 23 through conduit 29 and is removed therefrom through conduit 31. The process gas stream comprised essentially of uncondensed solvent vapor and nitrogen is caused to flow downwardly through tube section 27 of heat exchanger 23 to condense a further portion of the solvent vapor which is collected in the lower or sump portion 24 and is removed from this heat exchange device through conduit 28 which is coupled to drain conduit 17. A portion of the process gas stream supplied to overhead section 25 is removed therefore through conduit 26 as mentioned above.

The remaining non-condensed process gas stream is removed from lower portion 24 of heat exchanger 23 through conduit 30 and is introduced into portion 36a of an overhead section 36 of heat exchanger 33. This latter device is a shell and tube heat exchange unit, although the fluid introduced into the shell side thereof undergoes a dual pass as will be described hereinafter. This refrigerant is preferably an intermediate refrigerant medium such as toluene which is supplied to the shell side of heat exchanger 33 through conduit 52 and which flows downwardly as indicated by arrows therein on one side of partition 35 and then upwardly on the other side of such partition prior to leaving heat exchanger 33 through conduit 37. The process gas stream supplied through conduit 30 to overhead portion 36a flows downwardly through the tube section 34a into the gas space in lower or sump portion 38 of heat exchanger 33. A portion of the solvent vapor in this process gas stream is condensed within such tubes and is collected in lower portion 38 while the remaining process gas stream then flows upwardly through a remaining set of such tubes 34b into overhead portion 36b. A further portion of solvent vapor in the process gas stream condenses in such tubes and is collected in lower portion 38 of heat exchanger 33 and is removed therefrom through conduit 39 which communicates with drain conduit 17 and which is connected to the suction side of pump 40 thereby enabling condensed solvent to be recovered and pumped to suitable storage means (not shown). The non-condensed process gas stream collected in overhead portion 36b is removed therefrom through conduit 29 and is returned to the shell side of heat exchanger 23 as described above.

A final heat exchanger 43 is also a shell and tube heat exchange unit generally comprised of tubes 45 and 49, lower portions 46 and 50, and an overhead portion 48. A conduit 47 is adapted to receive a cryogenic liquid, such as liquid nitrogen, through control valve 55 and supply the same to lower portion 46 which is in communication with tubes 45 and which is separated from lower portion 50 by partition 44. As this cryogenic liquid flows upwardly through tubes 45, into overhead portion 48 and downwardly through tubes 49, the cryogenic liquid is vaporized and an inert gas, such as nitrogen, is removed from lower portion 50 through conduit 51 and may be utilized to establish and maintain inert gas curtains or barriers exteriorly of the entrance and exit of a curing oven (not shown). A suitable temperature sensing device 54 and a controller 56 responsive thereto is provided so as to control the setting of valve 55 in response to temperatures sensed by device 54. The intermediate refrigerant medium removed through conduit 37 from heat exchanger 33 is supplied by means of pump 41 through conduit 42 to the shell side of heat exchanger 43 and the chilled intermediate refrigerant medium is removed therefrom through conduit 52.

The operation of apparatus illustrated in FIG. 1 will now be described. The process gas stream supplied through conduit 1 is preferably of a substantially constant mass flow rate as blower 10 is preferably a fixed displacement blower. In the event that a reduction in the flow of such process gas stream occurs, the pressure in conduit 26 coupled to conduit 1 will likewise decrease, and this pressure change will be sensed by control valve 11 which is opened to increase the flow of recycle process gas through conduit 26 to thereby maintain a substantially constant mass flow of process gas supplied to the suction side of blower 10. The process gas stream leaving blower 10 through conduit 12 may be mixed with a spray of liquid solvent to reduce the temperature thereof and thereby facilitate condensation of solvent vapor in lower portion 16 of heat exchanger 13. Typically, the process gas stream supplied through conduit 12 exhibits a temperature of approximately 250°–350° F. As mentioned above, a portion of the process gas stream supplied to heat exchanger 13 is condensed and is collected in lower portion 16 thereof and removed through drain conduit 17. The non-condensed process gas stream which is removed from overhead portion 18 through conduit 21 may exhibit a temperature of approximately 95° F. A further portion of the solvent vapor contained in this process gas stream is condensed in heat exchanger 23 by means of the refrigeration provided in cold inert gas supplied to the shell side thereof through conduit 29. The warmed process inert gas, i.e. $N_2$, removed from heat exchanger 23 through conduit 31 may, for example, exhibit a temperature of 60° F. and is returned to the interior of a curing oven (not shown). It will be understood that the mass flow rate of the process inert gas, which will be essentially free of all but trace levels of solvent vapor and oxygen will be substantially equal to the mass flow rate of nitrogen and trace oxygen removed (in the process gas stream) from the curing oven through conduit 1 and consequently, a mass balance is established with respect to nitrogen or inert gas flows in and out of the curing oven without requiring extensive and costly control apparatus.

It will be understood that in each of heat exchangers 13 and 23, solvent vapor partially condenses in the interior of tubes therein and the downflow of such condensed solvent in the tubes effects a washing action thereby keeping such tubes clean and minimizing the tendency of such tubes to plug with any contaminants that may be carried therein. Also, by causing the flow of process gas in heat exchanger 23 to flow downwardly therethrough, the tendency of the gas phase in tube sections to entrain liquid droplets upwardly therethrough, which can occur upon introduction of the process gas stream into lower portion 24 thereof, is averted.

The non-condensed process gas stream removed from heat exchanger 23 may exhibit a temperature of approximately 80° F. and is supplied through conduit 30 to section 36a of the overhead portion of heat exchanger 33. This process gas stream then flows downwardly through a portion of the tubes, one being illustrated as tube 34a such that the process gas stream flows into lower portion 38 of heat exchanger 33 and upwardly through a second group of tubes, one of which is illustrated tube 34b. The remaining non-condensed gas which is collected in overhead portion 36b is essentially comprised of nitrogen, trace solvent vapor and oxygen and will exhibit a temperature of approximately −55° F. and may be returned through conduit 29 as the cold inert gas refrigerant supplied to the shell side of heat exchanger 23.

An intermediate refrigerant medium which is preferably a liquid such as toluene is circulated through heat exchangers 33 and 43 by means of pump 41. The cold intermediate refrigerant medium is supplied to the shell side of heat exchanger 33 through conduit 52 and flows downwardly as indicated by the arrows therein to the bottom of partition 35 and then upwardly through the shell side of heat exchanger 33 before exiting through conduit 37 for supply to the suction side of pump 41. Upon indirect heat exchange between the intermediate refrigerant medium supplied to the shell side of heat exchanger 43 and the cryogenic liquid in tubes 45, the intermediate refrigerant medium is chilled as it flows upwardly through the shell side of heat exchanger 43 before exiting therefrom through conduit 52. As mentioned previously, the cryogenic liquid is supplied through valve 55 and conduit 47 into lower portion 46 of heat exchanger 43, and upon exiting tubes 45, the cryogenic liquid which is now partially vaporized is returned downwardly through tubes 49 into lower portion 50. A suitable partition or barrier 44 is utilized to define lower portions 46 and 50 in heat exchanger 43. Nitrogen gas will leave heat exchanger 43 through conduit 51 at a temperature of typically 40° F. and may be utilized to establish and maintain inert gas curtains as previously described.

In order to avoid the freezing of intermediate refrigerant medium circulated throughout heat exchangers 33 and 43, temperature sensing device 54 is preferably adapted to sense the temperature of such medium in conduit 52. Typically, with a medium such as toluene, the temperature thereof will be approximately −80° F.

in conduit 52, and this temperature will rise to approximately 40° F. as the medium is supplied through conduit 37 and 42 to the shell side of heat exchanger 43. Upon temperature sensing device 54 detecting a temperature below a predetermined value, such as −80° F., controller 56 is responsive to cause control valve 55 to close thereby promptly reducing the flow of cryogenic liquid, i.e. $LN_2$, supplied therethrough and conduit 47 into lower portion 46. With this reduced flow of cryogenic liquid, the temperature of the intermediate refrigerant medium will rise toward a predetermined value in conduit 52, and consequently, freezing of such medium will be avoided.

It will be understood that one benefit in utilizing heat exchanger 33 is that by passing the process gas stream through tubes such as 34a and then into a free space in lower portion 38 before such stream flows upwardly through tubes such as 34b, heat exchanger 33 will act as a liquid-gas phase separator and will minimize the need for other phase separator devices to be utilized. Consequently, heat exchanger 33 minimizes the extent to which droplets of condensed solvent vapor are entrained in the process gas stream exiting overhead portion 36b, but in the event such droplets do exist, the same are rapidly vaporized upon passing through the shell side of heat exchanger 23.

Figure 2:
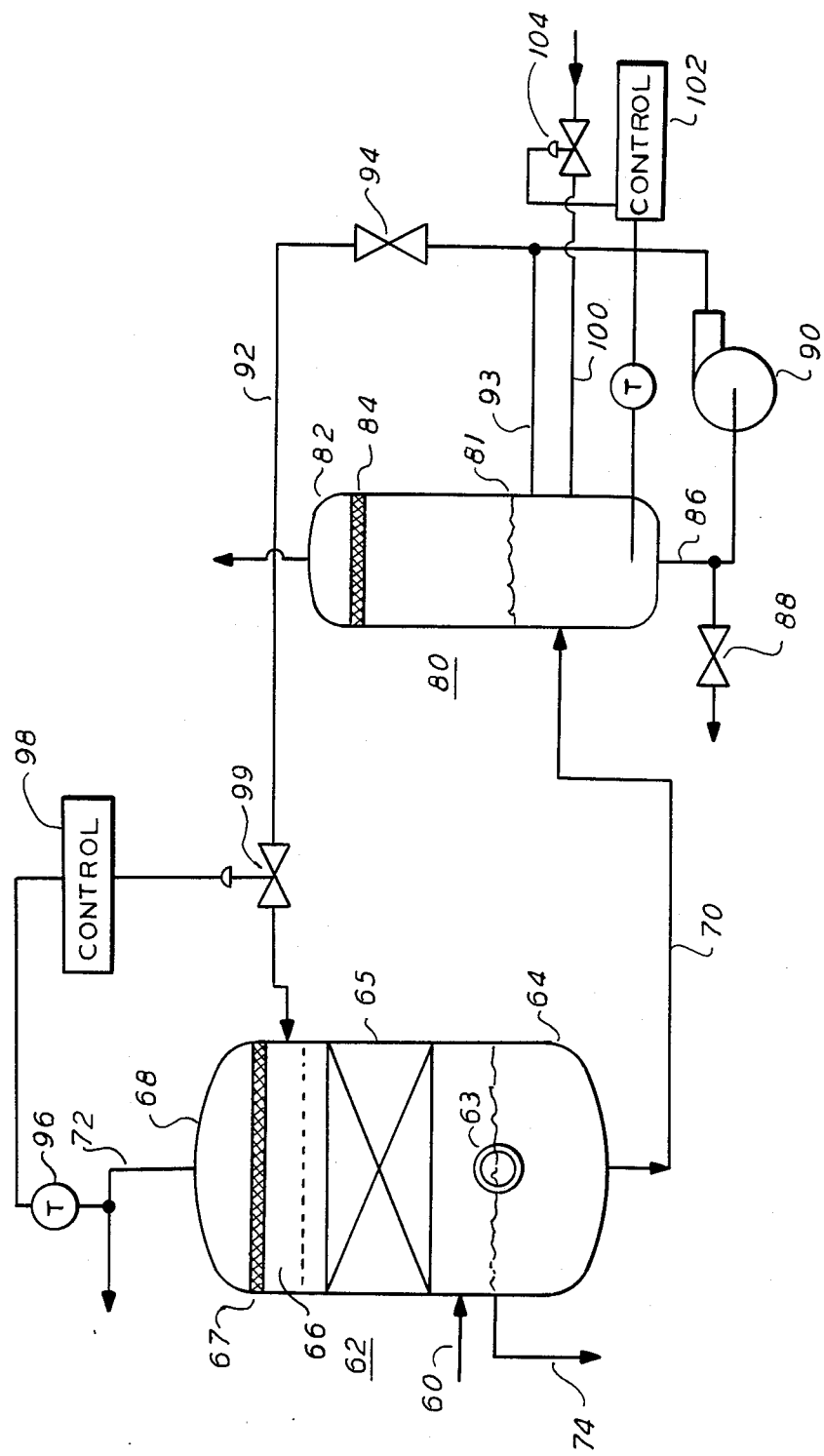
FIG. 2 is a diagramatic view of apparatus according to the invention utilizing direct contact heat exchange.

Referring now to FIG. 2, illustrated therein is a further embodiment of apparatus according to the invention wherein solvent vapor is condensed in a reflux heat exchanger 62 which receives condensed solvent which has been chilled as a consequence of direct contact with a cryogenic liquid. A reflux heat exchange device 62 is adapted to receive through conduit 60 the non-condensed gas from prior heat exchange means such as heat exchanger 23 depicted in FIG. 1. Reflux heat exchange device 62 is comprised of a lower section 64 which is preferably provided with a suitable sight glass 63 therein, a gas-liquid contact section 65 and an overhead section 68. An overflow outlet is preferably provided at about the level of sight glass 63 such that upon condensed solvent reaching the level of the overflow outlet, solvent will drain through conduit 74. Gas-liquid contact section 65 may take the form of commercially available contact media or packing such as Raschig rings which are appropriately disposed in the upper reaches of heat exchange device 62. A distributor plate 66 is positioned above gas contact section 65 so that liquid supplied through conduit 92 will flow evenly over contact media in section 65. In addition, a demisting pad 67 is disposed across overhead section 68 so as to minimize the passage of any droplets of condensed vapor upwardly into conduit 72.

Liquid chiller device 80 is provided with an outlet line 86 which communicates with lower section 81 and an overhead section 82. Vaporized inert gas exits chiller through conduit 89, and as this gas is substantially free of solvent vapor, it may be utilized to form inert gas curtains as described above. An on/off valve 88 is connected to line 86 and may be utilized to drain lower section 81 although valve 88 will normally be maintained in a closed or off condition. Outlet line 86 is connected to the inlet of recirculating pump 90 which in turn is effective to remove condensed solvent in lower section 81 of liquid chiller device 80 and supply the same to conduit 92 which is also connected to conduit 93. The recirculating, chilled, condensed solvent supplied through line 92 and valve 94 is utilized as reflux and is introduced into overhead section 68 of heat exchange device 62 with such reflux flowing downwardly through distributor plate 67 and over the contact media of section 65. Temperature sensing means 96 is connected through a conventional controller 98 to valve 99 to control the flow of chilled solvent in response to the temperature (which corresponds to a predetermined equilibrium partial pressure) of the gas removed from overhead section 68 of heat exchange device 62.

A further portion of the recirculating, chilled, condensed solvent is supplied through line 93 into lower section 81 of liquid chiller device 80 to augment the agitation and stirring action of the cryogenic liquid supplied thereto through line 100 and valve 104. A temperature sensing means 97 is also provided to detect the bulk temperature of chilled, condensed solvent in lower section 81 and to supply a signal to valve 104 through controller 102 which is effective in controlling the flow rate of cryogenic liquid in response to such sensed temperature. Essentially, the use of temperature sensing means 97 and valve 104 will be effective to preclude excessively low temperatures from being reached in lower section 81 and thus to prevent freezing or solidification of chilled, condensed solvent therein.

Solvent vapor in the process gas stream supplied through conduit 60 to reflux heat exchanger 62 is condensed upon contact with the chilled condensed solvent returned through conduit 92 to the upper reaches of heat exchanger 62. This contact essentially occurs in contact media section 65 and is effective to condense all but trace quantities of solvent vapor in the process gas stream. This stream is removed from overhead portion 68 of heat exchanger 62 through conduit 72 and is supplied to the interior of a curing oven so as to maintain the same in an inerted condition. It will be appreciated that the mass flow of the process gas stream returned through conduit 72 is substantially identical to the mass flow of inert gas removed from the curing oven and consequently, a mass balance with respect to inert gas (i.e. $N_2$) flows in and out of the oven is readily maintained without requiring extensive, complex control equipment therefor.

Condensed solvent is removed from reflux heat exchanger 62 through conduit 70 and is supplied into the lower portion of liquid chiller 80 into which a stream of cryogenic liquid nitrogen is supplied through conduit 100. This direct heat exchange between liquid nitrogen (−320° F.) and condensed solvent is effective to chill the same, and by injecting liquid nitrogen into the body of condensed solvent, the latter is agitated sufficiently to avoid freezing thereof. Chilled condensed solvent is withdrawn from liquid chiller 80 through conduit 86 by means of pump 90 which is effective to both supply chilled condensed solvent through conduit 92 and valve 99 to the upper reaches of reflux heat exchanger 62 and to return a portion through conduit 93 to liquid chiller 80 to assist in agitating the body of condensed solvent therein to assure that local freezing does not occur. Preferably, the temperature of chilled condensed solvent in liquid chiller 80 is sensed by means of a suitable temperature sensing device 97 such that a control device 102 responsive thereto is effective to adjust the setting of valve 104 and thereby modulate the flow rate of liquid nitrogen being supplied into liquid chiller 80. In this manner, desired temperatures are maintained in liquid chiller 80 which is effective to preclude freezing thereof and to control the degree to which condensed solvent is chilled for optimum operation in condensing solvent vapor in reflux heat exchanger 62.

From the foregoing, it will be appreciated that apparatus according to the invention enables cryogenic nitrogen to be utilized as a source of refrigeration in the course of condensing solvent vapor as well as for establishing and maintaining inert gas curtains exteriorly of a curing oven. This may be accomplished without mixing cryogenic nitrogen, which is substantially free and pure of solvent vapor, with the latter and thus discharge of solvent vapor to the ambient atmosphere through the means of a curtain or the like is precluded. In addition, the present invention enables a mass balance to be readily established between inert gas flows in and out of the curing oven without requiring complex control systems therefor. By establishing and maintaining such a material balance, the tendency of an atmosphere to flow outwardly of the oven and any tendency of ambient atmosphere to enter the oven is virtually eliminated. In the event that minor, transient conditions occur within the oven, and the pressure therein drops for any reason, minor quantities of inert gas from the curtains exteriorly of the oven will be drawn therein and tend to maintain the oven in an inerted condition. Furthermore, by maintaining a material balance as mentioned above, the requirement to supply considerable volumes of make-up inert gas is virtually eliminated as the process gas is returned entirely to the oven without venting. However, upon start-up and during purge conditions, additional pure nitrogen is preferably utilized and may additionally be employed to control the level of oxygen in a curing oven as described in U.S. Pat. No. 4,475,293. Furthermore, the interface apparatus described in this latter application may be utilized with curing ovens and solvent recovery systems according to the present invention, although the use of such interface equipment is not mandatory.

It will also be appreciated that solvent vapor may be condensed and recovered in accordance with the invention by use of apparatus illustrated in FIG. 1 or FIG. 2. Upon condensation of solvent vapor by indirect heat exchange with an intermediate refrigerant medium as previously described in connection with apparatus illustrated in FIG. 2, the possible entrainment of condensed solvent in overhead non-condensed process gas is significantly reduced, although this heat exchange apparatus will not respond to transients as quickly as will apparatus illustrated in FIG. 2 utilizing direct contact between a cryogenic liquid and condensed solvent. Thus, temperature changes and changes in flow rates or other transients may be compensated for more quickly by the use of apparatus illustrated in FIG. 2. However, the apparatus illustrated in FIG. 1 utilizing indirect heat exchange with an intermediate refrigerant medium such as toluene will of necessity reduce the possibility of inadvertently freezing condensed solvent as toluene has a freezing point of −139° F. and may be maintained at considerably higher temperatures as described above. Furthermore, the use of an intermediate refrigerant medium as described above precludes contact between moisture which may be included in minor amounts in the process gas stream and a cryogenic liquid and consequently, potential clogging of conduits or the like as a consequence of freezing of such moisture and accumulations thereof is avoided. As those skilled in the art will appreciate, moisture may enter the process gas stream upon curing of coatings on certain webs or substrates particularly fabrics which inherently contain moisture therein. Consequently, in the use of ovens wherein solvent-borne resin coatings on fabric material are being cured, it may be preferred to utilize solvent recovery apparatus illustrated in FIG. 1 to minimize the impact of possible accumulations of frozen moisture.

It will also be understood that the apparatus illustrated in FIGS. 1 and 2 will be accompanied by suitable safety valves and other pressure control equipment, and appropriate liquid level gauges will be utilized to maintain desired levels of condensed solvent in the lower portions of individual heat exchangers. In addition, appropriate control circuitry may be utilized to control the operation of pumps such as pump 40 in response to sensing particular levels of solvent in a heat exchanger such as, for example, heat exchanger 38.

The foregoing and other various changes in form and details may be made without departing from the spirit and scope of the present invention. Consequently, it is intended that the appended claims be interpreted as including all such changes and modifications.

We claim:

1. A method of recovering solvent vapor from an inerted oven during curing of a solvent borne resin coating on a web passing therethrough while maintaining a mass balance between inert gas flows in and out of said oven comprising the steps of:
   withdrawing oven atmosphere comprising inert gas and solvent vapor and supplying said withdrawn atmosphere to a first heat exchanger;
   condensing all but trace amounts of solvent vapor supplied to said first exchanger by indirect heat exchange with an intermediate refrigerant medium different from the liquid phase of said inert gas and returning a stream comprised of inert gas and trace solvent vapor to said oven at substantially the same flow rate at which inert gas is removed from the oven;
   supplying said intermediate heat exchange medium to a second heat exchanger and chilling said medium therein by indirect heat exchange with the liquid phase of said inert gas to thereby vaporize said liquid phase; and
   forming one or more inert gas curtains exteriorly of the oven in the vicinity of the web entrance and exit of the oven by supplying said vaporized liquid phase to said vicinity without mixing said vaporized liquid phase with said stream returned to said oven prior to forming said gas curtains.

2. The method defined in claim 1 wherein said inert gas is nitrogen.

3. The method defined in claim 1 wherein said intermediate refrigerant medium is a liquid.

4. The method defined in claim 3 wherein said liquid is toluene.

5. The method defined in claim 1 in which said first heat exchanger is a shell and tube heat exchanger having two shell and two tube sections and wherein said step of condensing solvent vapor comprises passing said intermediate refrigerant medium sequentially through both of said shell sections.

6. The method defined in claim 5 wherein the step of condensing solvent vapor comprises supplying said withdrawn oven atmosphere to the top of one tube section of said first heat exchanger and flowing said atmosphere downwardly therethrough to condense a portion of the solvent vapor therein, collecting said condensed solvent vapor and supplying the remaining non-condensed atmosphere to said second tube section such that said remaining non-condensed atmosphere flows upwardly therethrough thereby condensing all but said trace amounts of solvent vapor in said remaining atmosphere.

7. The method defined in claim 6 wherein the inert gas and trace solvent vapor removed from the top of said first heat exchanger is supplied to a third heat exchanger to condense at least a portion of the solvent vapor in the withdrawn oven atmosphere before the same is supplied to said first heat exchanger.

8. The method defined in claim 1 additionally comprising the steps of sensing the temperature of said chilled intermediate refrigerant medium; and controlling the flow rate at which said liquid phase of said inert gas is supplied to said second heat exchanger to maintain said intermediate refrigerant medium at or above a predetermined temperature.

9. Apparatus for recovering solvent vapor from an inerted oven during curing of a solvent borne resin coating on a web passing therethrough while maintaining a mass balance between inert gas flows in and out of said oven comprising:
   means for withdrawing oven atmosphere comprising inert gas and solvent vapor and means for supplying said withdrawn atmosphere to a first heat exchanger;
   means for condensing all but trace amounts of solvent vapor supplied to said first exchanger by indirect heat exchange with an intermediate refrigerant medium different from the liquid phase of said inert gas and means for returning a stream comprised of inert gas and trace solvent vapor to said oven at substantially the same flow rate at which inert gas is removed from the oven;
   means for supplying said intermediate heat exchange medium to a second heat exchanger wherein said medium is chilled therein by indirect heat exchange with the liquid phase of said inert gas to thereby vaporize said liquid phase; and
   means for forming one or more inert gas curtains exteriorly of the oven in the vicinity of the web entrance and exit of the oven by supplying said vaporized liquid phase to said vicinity without mixing said vaporized liquid phase with said stream returned to said oven prior to forming said gas curtains.

10. The apparatus defined in claim 9 in which said first heat exchanger is a shell and tube heat exchanger having two shell and two tube sections and wherein said means for condensing solvent vapor comprises means for passing said intermediate refrigerant medium sequentially through both of said shell sections.

11. The apparatus defined in claim 10 wherein the means for condensing solvent vapor comprises means for supplying said withdrawn oven atmosphere to the top of one tube section of said first heat exchanger such that said said atmosphere flows downwardly therethrough to thereby condense a portion of the solvent vapor therein, means for collecting said condensed solvent vapor and means for supplying the remaining non-condensed atmosphere to said second tube section such that said remaining non-condensed atmosphere flows upwardly therethrough thereby condensing all but said trace amounts of solvent vapor in said remaining atmosphere.

12. The apparatus defined in claim 11 wherein the inert gas and trace solvent vapor removed from the top of said first heat exchanger are supplied to a third heat exchanger wherein at least a portion of the solvent vapor in the withdrawn oven atmosphere is condensed before the same is supplied to said first heat exchanger.

13. The apparatus defined in claim 9 additionally comprising means for sensing the temperature of said chilled intermediate refrigerant medium; and means for controlling the flow rate at which said liquid phase of said inert gas is supplied to said second heat exchanger to maintain said intermediate refrigerant medium at or above a predetermined temperature.

* * * * *